United States Patent [19]
Guibert

[11] 4,326,497
[45] Apr. 27, 1982

[54] TWO-ZONE HOT AIR OVEN FOR FOOD-LOADED CARTRIDGES

[76] Inventor: Raul Guibert, 9635 Oakmore Rd., Los Angeles, Calif. 90035

[21] Appl. No.: 971,381

[22] Filed: Dec. 20, 1978

Related U.S. Application Data

[60] Division of Ser. No. 809,775, Jun. 24, 1977, which is a continuation-in-part of Ser. No. 776,772, Mar. 11, 1977, Pat. No. 4,112,916.

[51] Int. Cl.³ .................... A47G 23/04; F24C 15/32
[52] U.S. Cl. .................................................. 126/261
[58] Field of Search .............. 126/21 A, 261; 219/413

[56] References Cited

U.S. PATENT DOCUMENTS

| | | | |
|---|---|---|---|
| 3,800,123 | 3/1974 | Maahs | 219/413 |
| 3,861,378 | 1/1975 | Rhoads et al. | 126/21 A |
| 4,010,341 | 3/1977 | Ishammar | 126/21 A |
| 4,089,322 | 5/1978 | Guibert | 126/261 |
| 4,132,216 | 1/1979 | Guibert | 126/261 |

Primary Examiner—Samuel Scott
Assistant Examiner—W. S. Ratliff
Attorney, Agent, or Firm—Michael Ebert

[57] ABSTRACT

A hot air oven for heating food-loaded cartridges, each constituted by a stack of sealed trays containing precooked meals nested within an open carton whose side walls have holes therein to admit heated air. The oven includes a rotating turntable for supporting an annular array of such cartridges, the side walls of which define a hollow center core. A heater assembly produces heated air which is blown by a propeller into the hollow core, some of this air being forced through the holes of the cartons to heat the food in the trays. The remaining portion of the heated air passes through a flow passage below the cartridges to be drawn upwardly by the suction force of the propeller to create an air curtain around the array, thereby creating a toroidal flow pattern which envelops the annular array. The oven is divided by a shield placed within the hollow core into a hot zone and an extra hot zone, the cartridges on the turntable travelling cyclically through these zones. The temperature in the extra-hot zone is well above the service temperature to maintain a marked temperature differential between the heated air and the food even as it approaches its service temperature at which it can be dispensed to diners, thereby accelerating the heat-up rate at which the food is raised to its service temperature.

2 Claims, 7 Drawing Figures

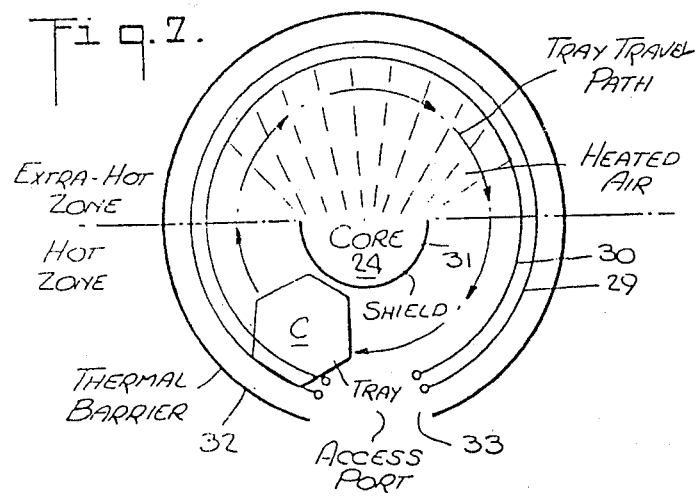
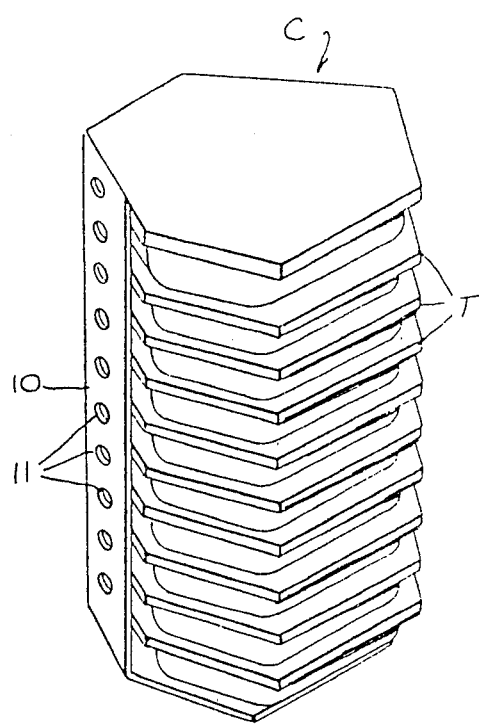
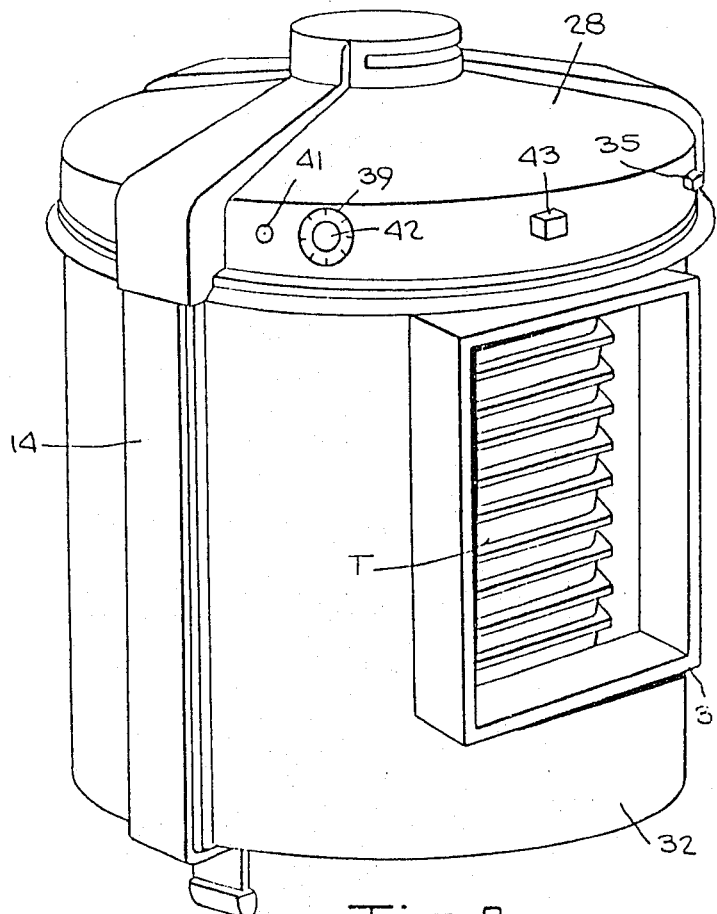
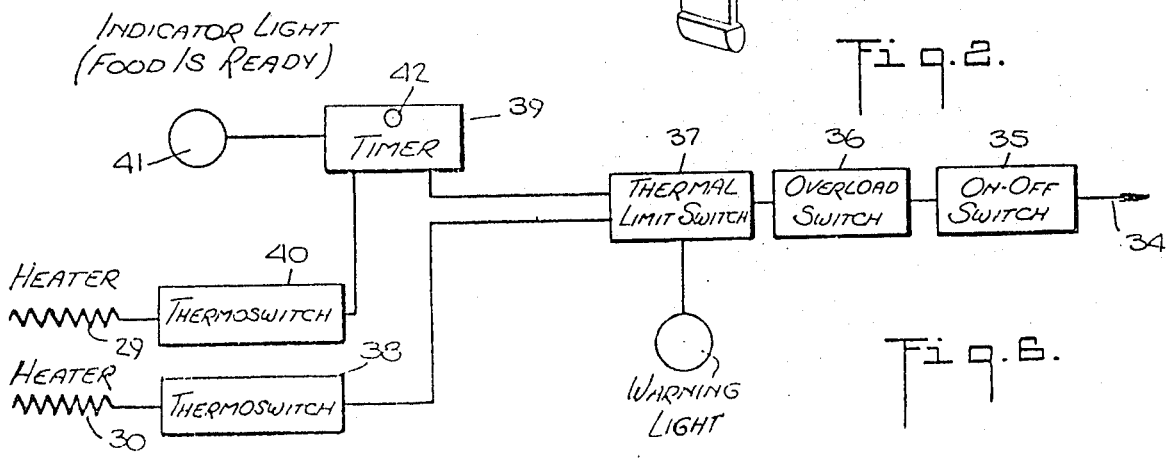

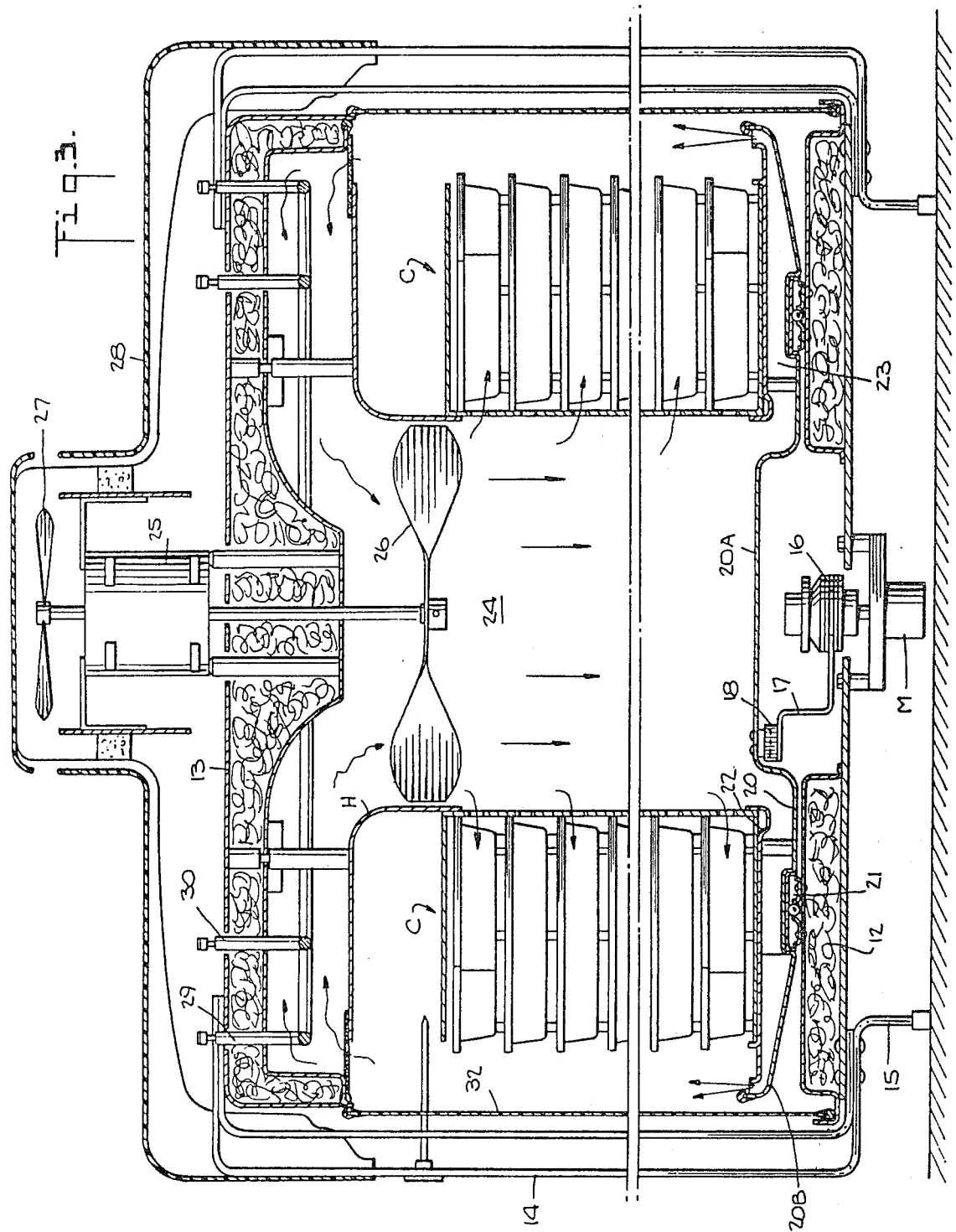

TWO-ZONE HOT AIR OVEN FOR FOOD-LOADED CARTRIDGES

RELATED APPLICATION

This application is a division of my copending application Ser. No. 809,775, filed June 24, 1977, of the same title, which in turn is a continuation-in-part of of my copending application Ser. No. 776,772, filed Mar. 11, 1977 entitled "Hot Air Oven for Food-Loaded Cartridges", now U.S. Pat. No 4,112,916.

BACKGROUND OF INVENTION

This invention relates generally to a fast food service technique wherein a meal is first cooked, then refrigerated and stored and subsequently reheated without degrading the basic texture, flavor and nutritional qualities of the meal, and more particularly to a hot-air oven for reheating the food to a service temperature at which it can be dispensed to diners, the oven including a thermal two-zone arrangement which acts to accelerate the heat transfer rate and functions to raise the temperature of the food to its service level within a relatively short period.

To meet the growing need for quickly-prepared, low-cost meals, fast-food operations have been developed in which the food to be served is first cooked, then deep-freezed and stored. When an order is placed for a particular item on the menu, the selected item is withdrawn from the freezer, the frozen pre-cooked meal is then thawed and reheated.

Though fast food techniques of the type heretofore known make possible relatively inexpensive meals and expedite service, the meals provided thereby are often unappetizing. The reason for this is that while freezing is effective in preserving food and in minimizing contamination, it often does so at the expense of the quality and flavor of the product. In the course of freezing, the moisture content of the food is converted into ice crystals which act destructively; for they rupture the internal structure of the food. As a consequence, frozen food has a characteristically tasteless and mushy quality.

Moreover, in reheating a pre-cooked frozen meal it is difficult when going from the frozen state to an adequately heated condition to avoid a situation in which the core of the product is still cold even though the outer layer is quite hot. And when one seeks to ensure that the body of the food is hot throughout, there is a tendency to overheat the meal and thereby re-cook it, with a resultant loss of nutritional value and flavor.

A major factor which militates against the success of self-service fast food techniques is that the heated food is necessarily stored in a closed heat chamber which must be opened to obtain access to the product. In a mass feeding operation in which a large number of heated meals must be stored in readiness for withdrawal by diners, this involves a complicated multi-compartment structure, each with a separate door that must be opened to remove the meal and then closed.

In my above-identified copending application Ser. No. 776,772, there is disclosed a fast food service technique and apparatus therefor whereby pre-cooked food which has been refrigerated may thereafter be reheated and made directly available to customers without degrading the essential texture, flavor or nutritional qualities of the meal.

My copending application Ser. No. 776,772, discloses a hot air oven for heating tray-loaded cartridges, each constituted by a stack of sealed trays containing precooked meals nested within an open carton whose side walls have holes therein to admit heated air. The oven includes a rotating turntable provided with a raised annular shelf for supporting an annular array of cartridges, the side walls of which define a hollow center core. A driven propeller is disposed within the core, the space between the shelf and the turntable forming a restricted flow passage whose inlet communicates with the core and whose outlet lies at the periphery of the turntable.

In this hot air oven, a heater assembly above the annular cartridge array produces heated air which is blown by the propeller into the hollow core. Because of the flow restriction, a substantial portion of the heated air is forced through the holes of the cartons to heat the food in the trays. The remaining portion of the heated air passes through the flow passage, the air discharged from the outlet thereof being drawn upwardly by the suction force of the propeller to create an air curtain around the cartridge array. Thus a toroidal flow pattern of heated air fully envelops the heated trays and serves to isolate the trays from the relatively cool ambient air without, however, interfering with direct access to the trays which may be withdrawn from the cartons when the food is at the desired temperature level for service to diners.

In an oven of the type disclosed in my copending application, a two-section heating assembly is provided having different wattages, whereby at the outset of heating, both sections are operative for a controllable period, hereinafter called the heat-up phase, sufficient to raise the food temperature to the desired service level, after which the main section is rendered inactive while the auxiliary section which draws much less power then serves to maintain indefinitely the heated food at the proper level, for service to diners, hereinafter called the "service phase".

During the heat-up phase, the rate of heat transfer from the hot air in the oven to the relatively cold food-loaded cartridges depends on the temperature differential; the greater the difference between the hot air temperature and the food temperature, the more rapid the rate of heat transfer.

Since the hot air temperature throughout the oven is at a fairly uniform level, the transfer rate at the outset of heating in the heat-up phase when both heater sections are operative is very rapid, but as the difference in temperature between the hot air and the food thereafter diminishes, the rate of transfer becomes increasingly slow and quite sluggish as the service temperature is approached.

Assuming that the food in the cartridges is initially at a temperature of about 40° F. and it is necessary to raise the food temperature to a service level of about 150° F. and further assuming a hot air temperature of about 165° F., then at the outset of the heat-up phase, there will be a sharp differential giving rise to very rapid heating. But as this temperature differential diminishes in the course of the heat-up phase, the rate of heat transfer slows down. When, for example, the food temperature reaches 130° F., the temperature differential relative to the heated air is only 35° F., and it takes a relatively long time before the food temperature can be raised to the service temperature of 150° F., at which point the heat-up phase is concluded and the service phase takes over with only one heater section operative to maintain this service temperature level.

Thus if one plots a curve of cartridge food temperature (40° F. to 150° F.) vs. time in the heat-up phase, the resultant curve for a hot-air temperature of 165° F. will exhibit a sharp rise from 40° F. to about 100° F. within a fairly short time interval, the curve thereafter leveling off as the temperature goes more gradually from 100° F. to 150° F. As a result, the duration of the heat-up phase is unduly prolonged, which in some situations may be a practical disadvantage.

If, for instance, a fast-food installation having a hot-air oven of the type disclosed in my copending application Ser. No. 776,772 is loaded with cold food cartridges which must be made available for service to diners in about one hour after loading, this time may be inadequate to bring the food to its proper service level.

In a technique in accordance with the invention, the trays are kept under refrigeration at a temperature just above the freezing point of the pre-cooked food which, in practice, may be in a range of about 20° F. to 30° F.; for where the moisture content of the food is rich in dissolved salts, the freezing point may be well below 32° F. It is important that the refrigeration, while close to freezing, not fall below the freezing point; for the formation of destructive ice crystals in the food must be avoided. It is also important to seal the trays to avoid the loss of moisture and volatile constituents. If, therefore, the cartridges containing the trays have just been removed from the refrigerator before being placed in the hot air oven, the necessary heat-up phase to raise the food temperature from, say, 20° F. to 150° F. with an oven of the type disclosed in my copending application Ser. No. 776,772 may be well over an hour, a period which is excessively long for some fast-food operations.

SUMMARY OF INVENTION

In view of the foregoing, the main object of this invention is to provide an improved hot-air oven which affords a faster heat-up phase than an oven of the type disclosed in my above-identified copending application, whereby the food in the tray-loaded cartridges may be raised to a service temperature within a relatively short period.

More particularly, an object of the invention is to provide a hot-air oven divided into a hot and an extra hot zone such that as the tray-loaded cartridges containing pre-cooked meals are carried by a turntable cyclically through these zones, the extra-hot zone acts to maintain a marked temperature differential between the temperature of the food trays and the hot air even as the food approaches the service temperature, whereby the transfer rate is rapid throughout the entire heat-up phase without, however, unduly heating the material of the trays.

A significant feature of the invention resides in the fact that the trays are formed of a synthetic plastic material whose softening point is below the extra-hot zone temperature; yet because of the lower temperature of the hot zone which the trays also traverse during each cycle of rotation, the trays are never brought to their softening point in the course of the heat-up phase.

Briefly stated, these objects are attained in a hot-air oven for heating food-loaded cartridges, each constituted by a stack of sealed trays all containing a pre-cooked meal, the stack being nested within an open carton whose side walls have holes therein to admit heated air. The oven includes a rotatable turntable provided with a slightly-raised annular shelf for supporting an annular array of cartridges forming a hollow center core whose boundary is defined by the walls of the cartons. Within the core is disposed a driven propeller, the space between the shelf and the turntable forming a restricted flow passage whose inlet communicates with the hollow core and whose outlet lies at the periphery of the turntable.

A heater assembly mounted above the cartridge array produces heated air which is blown by the propeller into the hollow core. Because of the flow restriction and the configuration of the carton walls, a substantial portion of the heated air is forced through the holes in carton walls in the cartridge array to heat the food in the trays, the remaining portion passing through the flow passage. The heated air escaping from the outlet of the flow passage is drawn upwardly by the suction force of the propeller to create an air curtain around the cartridge array which returns the air to the heater assembly for reheating and recirculation. The air curtain is surrounded by a thermal barrier having a front access port therein to provide access to the interior of the oven whereby cartridges may be inserted in the oven when loading the shelf and selected trays may be withdrawn therefrom when dispensing meals to diners.

The heater assembly is constituted by two concentric arcuate sections of different capacity, both of which are initially energized to raise the oven temperature to a high level and to bring the food to the desired service temperature in the course of a heat-up phase, after which the larger capacity main section is cut off automatically by means of a timer, whereby the food in the oven is thereafter maintained at the desired level during a service phase by the smaller auxiliary section.

Thus a toroidal flow pattern of heated air is created which fully envelops the annular array of cartridges and serves to isolate the trays from the relatively cool ambient air, without, however, interfering with direct access to the trays which may be withdrawn from the cartons through the access port when the meals are at the desired service temperature.

In order to accelerate the rate in the heat-up phase at which the food is raised to its service temperature, disposed within the hollow core of the oven in the sector thereof facing the access port is an arcuate shield which acts to restrict the passage of heated air through the holes of cartons in the shielded sector of the core so that as the turntable rotates, the cartridges are subjected to heated air from the core only when they travel through the unshielded sector.

As a result, the oven is effectively divided into a shielded hot zone and unshielded extra-hot zone, the heater arrangement being such that the temperature in the extra-hot zone is well above the service food temperature and is even above the softening point of the plastic trays. But because the turntable during each cycle of rotation at 1 RPM carries the cartridges from the extra-hot zone to the hot zone whose temperature is below the softening point of the trays, the trays never reach their softening point in the course of the relatively short heat-up phase.

The two-zone oven accelerates the food heating process; for even when the food temperature approaches the service temperature, there is still a marked temperature differential between the food temperature and the super-hot temperature to promote more rapid heat transfer. Thus instead of a time-temperature curve in the heat-up phase which rises steeply and then gradually levels off, the curve remains relatively steep throughout the entire heat-up phase, thereby shortening the duration of the heat-up phase.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a tray-loaded cartridge containing pre-cooked food for use in a hot air oven in accordance with the invention;

FIG. 2 is a perspective view of the oven;

FIG. 3 is a longitudinal section taken through the oven;

FIG. 5 is a block diagram of the electrical circuit for the heater section of the oven;

FIG. 6 is a perspective view of the shield which effectively divides the oven into a hot and an extra hot zone to provide two-zone operation; and FIG. 7 schematically illustrates the two-zone oven arrangement for accelerating the heating of the food in the heat-up phase of oven operation.

DESCRIPTION OF INVENTION

The Cartridge

Figure 4:
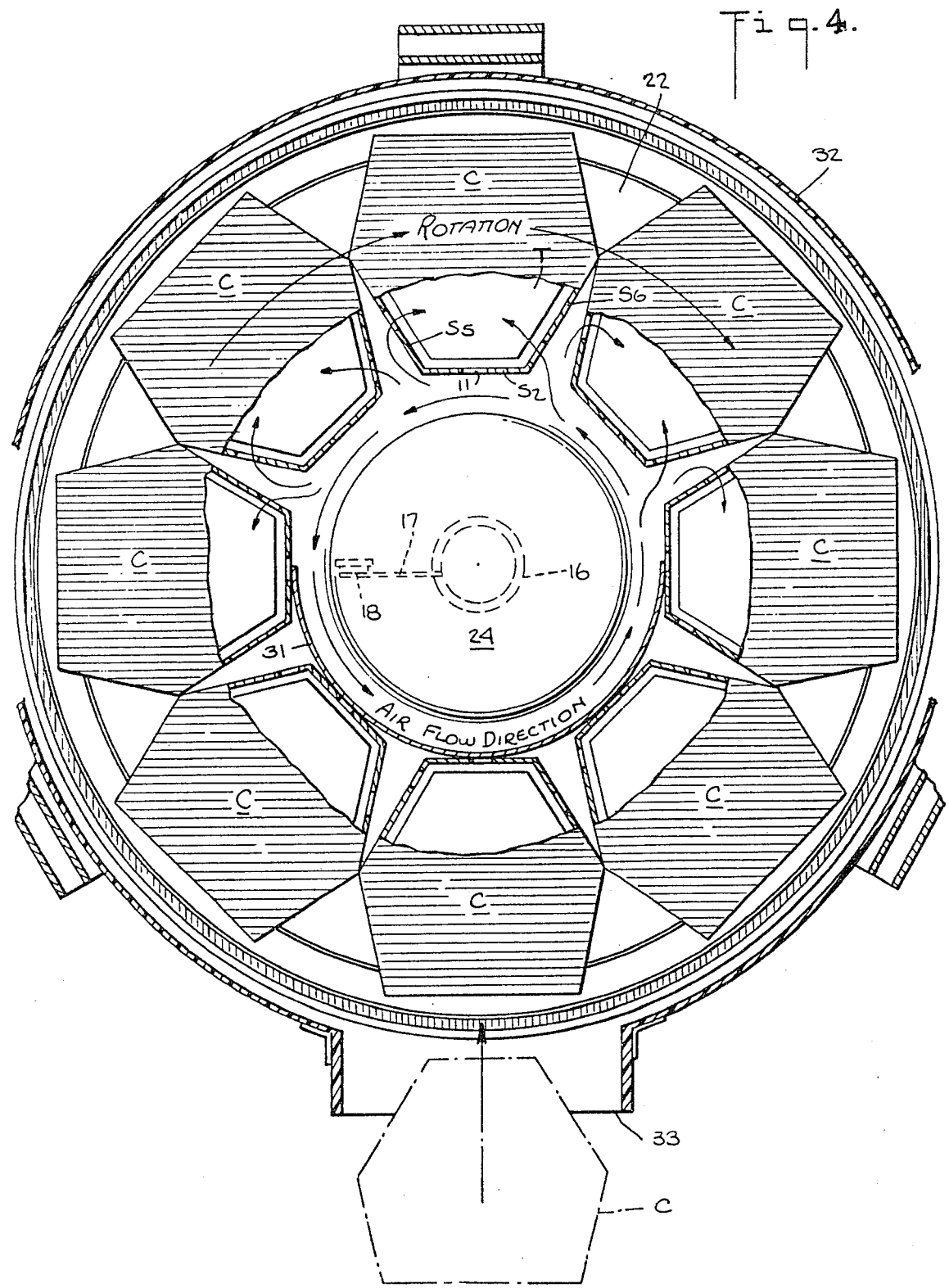
FIG. 4 is a transverse section taken in the plane indicated by line 4—4 in FIG. 2.

Referring now to FIG. 1, there is illustrated a cartridge C containing a stack of like trays T. Each tray has a hexagonal configuration and a similarly shaped cover to provide a container for refrigerating and later serving a pre-cooked meal after the cooled tray has been reheated by hot air in an oven in accordance with the invention. A more detailed description of the cartridge is set forth in the above-identified copending application.

The tray and the cover therefor are both fabricated of a synthetic plastic material, such as polyethylene, acceptable for and non-reactive with food, the material being capable of withstanding the wide range of temperatures involved in refrigerating and reheating the food contents to a service temperature. By service temperature is meant a food temperature which is below the temperature at which food boils or otherwise cooks and yet is high enough to cause the food when served to a customer to be regarded as hot off the oven. The tray cover is formed of lower density material than tray T so that it is more flexible than the tray and can be pried off without difficulty.

The trays are nested within an open carton 10 having two side walls and a rear wall which conform to three sides of the hexagonal trays, the other three sides of the trays being exposed, making it easy to remove the trays from the carton.

The rear and side walls of the carton are provided with a row of large holes 11 to admit heated air into the carton for raising the temperature of the food in the trays nested therein. Circulation of the hot air within the carton is facilitated by the flanges on the trays which maintain spaces between the side walls thereof and the side walls of the carton, the external ribs on the bases of the trays which maintain spaces between the tray bases and the tray covers in the stack thereof. Thus each tray in the stack is exposed to hot air admitted into the carton through its corresponding holes.

In the embodiment of the hot-air oven to be later described, the oven capacity is eight cartridges; hence eighty trays of food. Since each cartridge holds a different pre-cooked food preparation, the consumer may be presented with a menu with eight listings. The fact that during a given service period not all of the trays are dispensed does not give rise to waste; for the unused trays may be returned to a cooling chamber and again refrigerated preparatory to the next demand therefor when they are again heated to the service temperature.

The Hot Air Oven

Referring now to FIGS. 2 to 7, there is shown an oven in accordance with the invention which is adapted to accommodate eight cartridges of the type previously described and to raise the temperature of the food contents to a suitable service level in the range of about 150° to 170° F., and to then maintain this temperature with a minimal amount of heat loss. Thus the energy requirements for the oven are relatively low, even though the oven has a permanently open access port through which the selected food trays may be removed.

The oven includes a circular base 12 which is packed with thermal insulation and a circular roof 13, also packed with thermal insulation. The roof is supported above the base by three equi-spaced metal columns 14 formed by narrow strips of metal whose lower ends curve in under base 12 and then extend downwardly therefrom to form feet 15 which serve to raise base 12 above ground.

Supported below the center of base 12 is a small motor M whose shaft is coupled to a slip clutch 16. The output of clutch 16 is operatively coupled to an arm 17 having a pusher finger 18 at its end, the rotating finger engaging an abutment 19 on the underside of a turntable 20 to drive the turntable. Turntable 20 rides on bearings 21 seated on the upper face of base 12.

Turntable 20 is formed with a central hump 20A and an upturned outer rim 20B. Slightly raised above turntable 20 and supported thereabove by posts is an annular shelf 22 which surrounds hump 20A. The space between shelf 22 and turntable 20 defines a restricted flow passage 23 whose inlet lies at central hump 20A and whose outlet lies at the periphery of the turntable.

Shelf 22 is dimensioned to support a circular array of eight stock cartridges C. The side walls of the cartridge cartons, as best seen in FIG. 4, form the boundary of a hollow central core 24 extending vertically above hump 20A, the hollow core communicating with the inlet to flow passage 23.

Mounted centrally above roof 13 is a motor 25 having an armature shaft which extends downwardly through the roof and terminates in a main propeller 26 disposed within hollow core 24. Attached to the other end of the motor shaft is an auxiliary propeller 27 functioning as a cooling fan for the motor. Propeller 27 blows air into the region between roof 13 and a plastic dome 28 supported thereabove. The space between the dome and the roof serves to house the electrical controls associated with the oven and is ventilated by cooling air from the auxiliary propeller, the head of the dome being vented.

Supported from roof 13 is a heater assembly having a high-wattage main section 29 and an intermediate wattage auxiliary section 30, the sections being installed in the open space between the upper end of the array of cartridges C and the overlying roof 13. The sections are formed by heater elements curved to define two concentric circles surrounding the hollow central core 24, each circle having a gap as a result of the input terminals to the heater section. Thus the air heated by sections 29 and 30 is sucked into hollow core 24 by the main propeller 26 and is blown therethrough at high velocity to create a flow vortex. Below the heater assembly is an inlet horn H, which is suspended from roof 13 by posts.

Because of the restricted flow passage 23, all of the heated air blown down the core cannot escape therethrough, and a substantial portion thereof is forced through holes 11 in the cartons defining the boundary of the hollow core. It will be seen in FIG. 4 that this boundary is composed of the rear walls of the several cartons which are arranged in a circle, the breaks between these rear walls being bonded by the side walls which form triangular alcoves.

Thus the heated air is forced through the holes 11 not only in rear walls but also in the side walls of the cartons, the heated air penetrating the carton being distributed throughout the spaces between the trays stacked therein, thereby heating the food contents. The pockets created by the alcoves extract heated air from the vortex and serve to dispose the air to supply substantially the same amount of heat in all trays.

The portion of the heated air blown down hollow core 24 which is not forced through the array of cartridges to heat the trays passes into the inlet of the restricted flow passage 23 and emerges upwardly from the outlet thereof at the periphery of the turntable. The air escaping from this outlet is drawn upwardly and returned to the space occupied by the heater assembly for recirculation. The upwardly drawn air creates a cylindrical air curtain which surrounds the array of cartridges.

Thus the flow pattern of heated air produced within the oven creates a toroidal loop which fully envelops the circular array of cartridges therein to isolate the heated trays from the cooler ambient air and to minimize heat losses. In order to conserve space, the air curtain is arranged to directly surround the cartridge array and consequently is subject to disruptive impingement by air passing laterally through the trays. The air curtain is therefore surrounded by a cylindrical thermal barrier 32. This barrier is preferably formed by inner and outer plies of clear synthetic plastic material capable of withstanding the heat of the oven, as shown in FIG. 4. These plies may be of Lexan (a thermoplastic carbonate-linked polymer), between which is sandwiched a woven metal or plastic grid providing an air space separating the plies. Mounted on thermal barrier 32 at the front of the oven is a rectangular access port 33 which is large enough to permit the cartridges C to be manually inserted therein and loaded on the turntable shelf.

The Control System

As shown in FIG. 5, the main heater element 29 and the auxiliary heater element 30 are both energized through a power line 34 having an on-off switch 35 therein which serves to turn on power for both elements. The line from switch 35 goes through a protective overload switch 36 into a thermostat switch 37 which cuts off power to both heater elements should the heat in the oven exceed a pre-set value.

From limit switch 37 there are two line branches: one leading to auxiliary heater 30 through a thermostat switch 38, and the other leading to main heater 29 through a controllable timer 39 and a thermostat switch 40. Associated with timer 39 is an indicator light 41 which is normally off and turns on only when the timer runs out. Timer 39 is provided with an operating button 42. The fact that the line power is switched on is indicated by a pilot light 43. Timer 39, main switch 35, pilot light 43 and indicator light 41 are all mounted on the dome of the oven.

When power is turned on, auxiliary heater 30 is immediately energized, whereas main heater 29 is energized only after timer button 42 is pressed in. This timer is adjustable; and assuming that it takes one hour using both heater elements to bring the food in the oven to the service temperature level, say, 150° F., then the timer is set for one hour, this being the heat-up phase.

At the end of the one-hour timing interval, timer 39 cuts off power to the main heater, at which point the indicator light 41 turns on to give notice that the meals are ready to be served. Thereafter, auxiliary heater 30, which remains operative under the control of thermostat 38, which is set to 150° F., functions to maintain the desired temperature level during the indefinite service phase.

Two-Zone Operation

In order to realize a two-zone heating operation in accordance with the invention, placed vertically within hollow core 24 of the oven is an arcuate shield 31. This shield, which is shown separately in FIG. 6, conforms to the boundary of the core and acts to confine the flow of hot air into the cartridges carried on the turntable to the rear sector of the oven interior, thereby minimizing the escape of air through access port 33 in the front sector of the oven.

The fixed position of shield 31 within hollow core 24, as shown in FIG. 4, is such that the outer wall of the shield is closely adjacent to the back wall of the cartons in the annular array of cartridges C carried on the rotating turntable. Hence, as shown schematically in FIG. 7, the heated air blown through the core can only pass through the holes 11 in the carton walls when the cartons are travelling through the unshielded rear sector of the oven.

The two concentric sections 29 and 30 of the heater assembly, as shown in FIG. 7, are so arranged that their power input terminals lie in the front sector of the oven. The gap defined by these terminals cause these portions of the heater sections to produce less heat in this region of the oven than the heat produced by the uninterrupted heater sections which lie in the rear sector of the oven.

Mainly by reason of shield 31 and to a lesser extent because of the gaps in the concentric heater sections 29 and 30, the rear sector of the oven becomes substantially hotter than the front sector thereof. Hence the shield effectively divides the oven into a front Hot Zone which includes access port 33, and a rear Extra-Hot Zone. During each cycle of rotation, trays T in the cartridges traverse the Hot Zone and then the Extra-Hot Zone.

In practice, when both heater sections are operating in the heat-up phase, the parameters are such as to provide a temperature in the Hot Zone of about 150° to 160° F. and a temperature in the Extra-Hot Zone as high as 190°1 F.

The temperature in the Hot Zone is well above the service temperature of the food, which is approximately 150° F., and it also may be higher than the softening point of the plastic material from which the food trays are fabricated, depending, of course, on the nature of this material. In the case of polyethylene trays, this softening point is about 165° F. Since the food is never to be heated above its service temperature in order to avoid recooking thereof, a softening point of 165° F. for the tray material represents no problem in this regard, for it is safely above the normal food service temperature.

However, this softening point for polyethylene is below the Extra-Hot Zone temperature, and this factor must be taken into account. Because the plastic trays alternately travel from the Hot Zone whose temperature is quite a few degrees below the polyethylene plastic softening point to an Extra-Hot Zone whose temperature is well above the softening point, the mean temperature is such that the plastic never reaches the softening point within the relatively short heat-up phase made possible by the two-zone oven arrangement.

At the conclusion of the heat-up phase, the major heater section of the assembly is cut off and the resultant temperature is such as to maintain the heated food at the service temperature level (about 150° F.) which is safely below the plastic softening point.

Obviously, if the plastic trays were kept in the two-zone oven for a prolonged heat-up period, plastic could in time be softened because of the high temperature in the Extra-Hot Zone and the trays rendered unacceptable. But the heat-up phase in the present invention is of relatively short duration.

The reason for this relatively brief heat-up phase is that the rate of heat transfer is not, as in the case of an oven without a two-zone arrangement, rapid merely at the outset of heating when the heat differential is great and thereafter increases sluggishly as the food temperature approaches the service temperature level, but is rapid for the entire range of food temperatures running from an initial cold temperature to a hot service temperature level at the completion of the heat-up phase.

Because the hot air temperature in the Extra-Hot Zone is much higher (i.e., 190° F.) than the food service temperature (i.e., 150° to 160° F.), even though the temperature differential between the hot air temperature and the prevailing food temperature is greatest at the outset of the heat-up phase, it never reaches a condition where this differential is small; for even as the food temperature approaches the service temperature, say, at 135° F., the differential between the then-prevailing temperature and the Extra-Hot Zone temperature remains fairly large and the rate of heat transfer is therefore still quite rapid.

Hence, instead of having a food temperature vs. time curve for the heat-up phase, which is steep for the first 15 minutes or so of heat-up and then proceeds to level off to a degree that it takes an extended time to raise the temperature of the food to the service level, with the two-zone arrangement in accordance with the invention, though the curve becomes somewhat less steep as one approaches the service level, at no time does the curve reflect a slow heat-up rate. As a consequence, where for a given food load, it may take well over an hour to complete a heat-up phase in the absense of a two-zone heating operation, with the present invention the duration of this phase can be no more than an hour or less.

While there has been shown and described a preferred embodiment of a two-zone hot air oven for food-loaded cartridges in accordance with the invention, it will be appreciated that certain changes and modifications may be made therein without, however, departing from the essential spirit thereof.

I claim:

1. The method of heating pre-cooked food contained in a tray which is initially at a predetermined cold temperature to bring the temperature of the food to an elevated service temperature which is below the temperature at which the food will be subject to re-cooking, and to maintain the food at this service temperature, said method comprising the steps of:
   A. subjecting the tray during a heat-up phase to periodic pulses of air at a constant predetermined frequency flowing past the tray at a relatively high velocity, said pulses of air being separated by no-flow intervals during which heat transfers occurs within the food, said pulses of air being at a re-cooking temperature above said service temperature to rapidly raise the temperature of the food from said cold temperature to said service temperature without raising the internal temperature of the food substantially above said service temperature; and B. thereafter during a service phase subjecting the tray to a flow of air which is heated to a temperature below said re-cooking temperature maintaining the food at the service temperature.

2. The method as set forth in claim 1, wherein said flowing air is directed in a path surrounding said tray to create a curtain isolating said tray from ambient air.

* * * * *